*Marshall & Schroeder,*

*Elevator,*

Nº 79,138. Patented June 23, 1868.

Witnesses:

Inventor:

United States Patent Office.

JOHN E. MARSHALL AND JACOB W. SCHROEDER, OF BALTIMORE, MARYLAND.

Letters Patent No. 79,138, dated June 23, 1868.

---

IMPROVEMENT IN HOISTING-APPARATUS.

---

The Schedule referred to in these Letters Patent and making part of the same.

---

TO ALL WHOM IT MAY CONCERN:

Be it known that we, JOHN E. MARSHALL and JACOB W. SCHROEDER, of Baltimore, in the county of Baltimore, and in the State of Maryland, have invented new and useful Improvements in Hoisting-Apparatus; and do hereby declare that the following is a full, clear, and exact description thereof, reference being made to the accompanying drawings, and to the letters of reference marked thereon.

Figure 1:
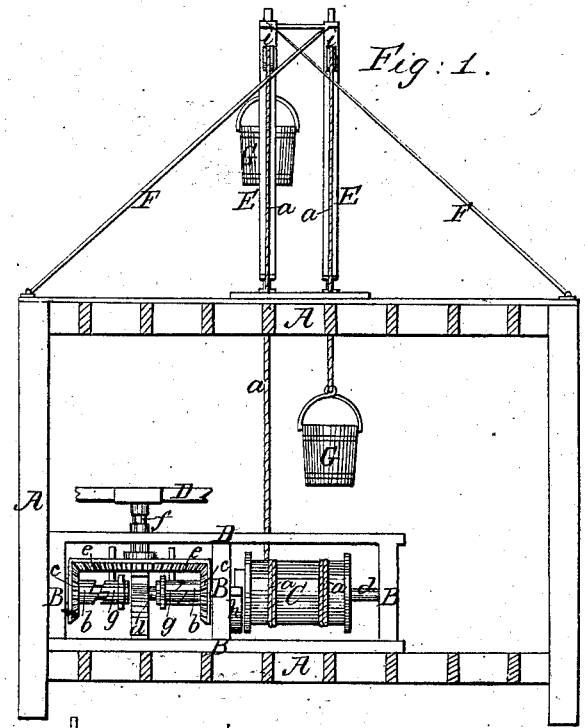

In the annexed drawings, forming part of this specification,

Figure 1 represents a front view of the hoisting-apparatus, and

Figure 2:
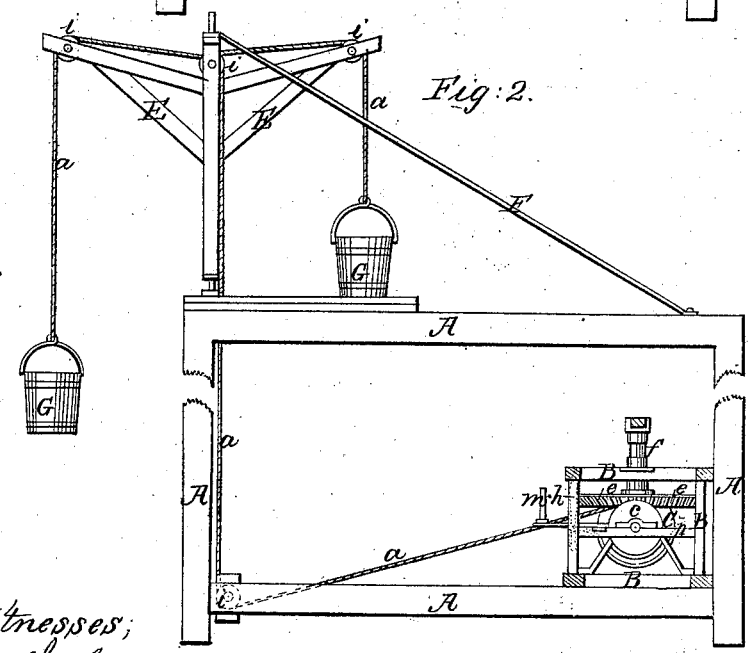

Figure 2 a side view of the same.

A represents a section of a building, in which the machine is placed. B is the frame, for the horse-power. C is a spool, to receive and deliver the ropes $a$ $a$, which run through the grooved pulleys $i$ $i$ to the cranes E E, which cranes are secured by the braces F F. At the end of the ropes $a$ $a$ are buckets G G, for conveying material. $c$ $c$ are bevelled pinions, which are connected with clutches $b$ $b$, and run loose on shaft $d$. $e$ is a bevelled gear, secured to shaft $f$, and working in pinions $c$ $c$, when the lever D, at the top of shaft $f$, is turned. $g$ $g$ are clutches, connected together by the bar $m$, and fitting on a feather in shaft $d$, having lateral motion thereon. $h$ is a brake, with handle $k$ to regulate the motion of the spool C.

The operation is as follows:

The machine being secured in position, either outside the building, in the cellar, or on a floor of the building, a horse is attached to lever D, which is long enough to allow him to move in a circle around the machine. Sufficient rope is rigged to allow the buckets G G to be in position, one at the top and the other at the base of the building, connecting with the spool C, and passing under and over the grooved rollers $i$ $i$ in the cranes E E. The bucket being filled and the machine started, the clutches $g$ $g$ are thrown in gear, causing the shaft $d$ to revolve with the spool C, winding the rope, and carrying the bucket to the top of the building on one crane, and at the same time unwinding and lowering the empty bucket from the other crane. Upon the buckets arriving at the top, the clutch is thrown out of gear, and the brake $h$ applied until the full bucket is emptied and the empty one at the base filled, when the clutch $g$ $g$ is again thrown in gear, but on the opposite side, causing the shaft $d$ and spool C to revolve in the opposite direction, by which means the full bucket is elevated and the empty one lowered, as before.

By this arrangement the machine may be kept in constant operation without any change in the direction of the motive-power, and is applicable to steam as well as horse-power.

Having thus fully described our invention, what we claim as new, and desire to secure by Letters Patent, is—

1. The revolving cranes E E, in connection with the rope $a$ and spool C, arranged and operating substantially as and for the purposes above set forth.

2. The combination of the bevelled gear $e$, bevelled pinions $c$ $c$, clutches $g$ $g$ and $b$ $b$, spool C, with brake $h$ revolving on the shaft $d$, and the rope $a$, revolving cranes E E, braces F F, and buckets G G, arranged and operating substantially as and for the purposes above set forth.

In testimony that we claim the foregoing, we have hereunto set our hands, this 13th day of April, 1868.

JOHN E. MARSHALL,
JACOB W. SCHROEDER.

Witnesses:
LEWIS R. KEIZER,
W. H. HAYWOOD.